Sept. 20, 1949.  A. E. LITTLE  2,482,628
PARALLAX COMPENSATING VIEW FINDER FOR CAMERAS
Filed May 9, 1946  2 Sheets-Sheet 1

INVENTOR.
Alfred E. Little.
BY
Attys

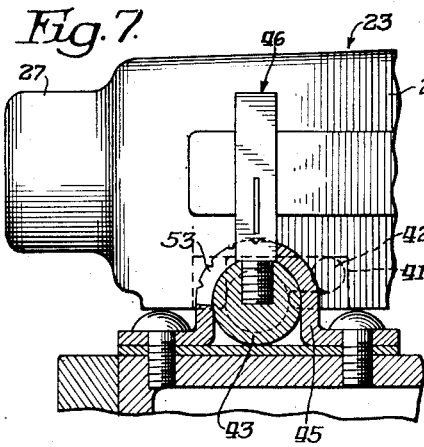
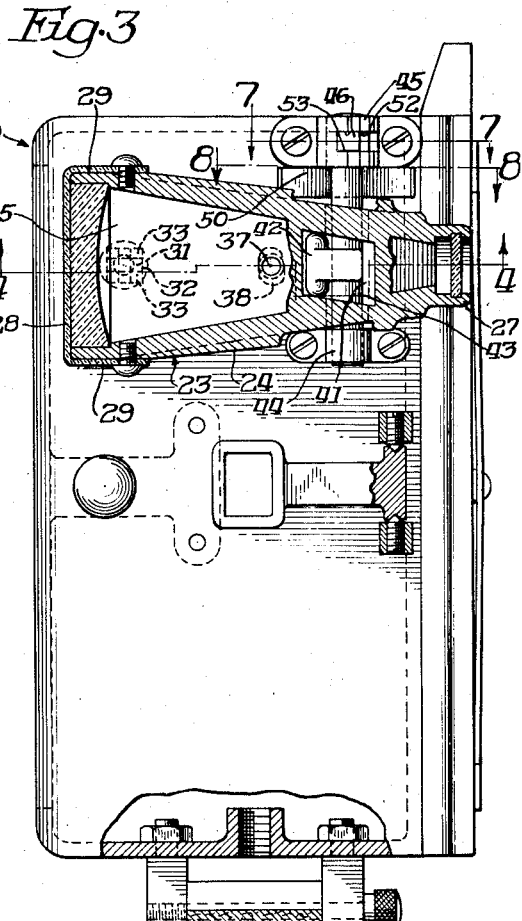
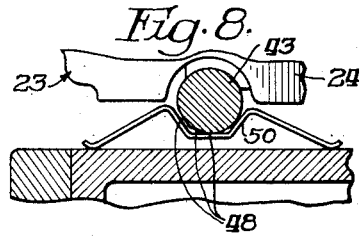
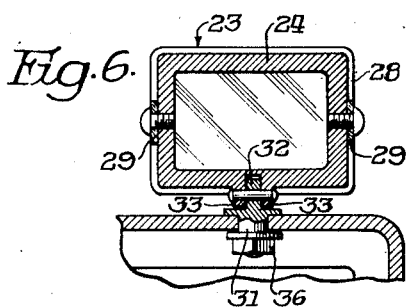
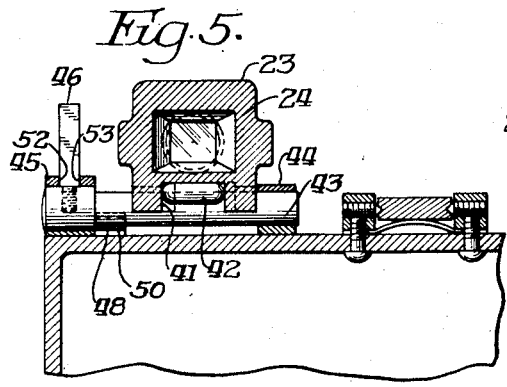
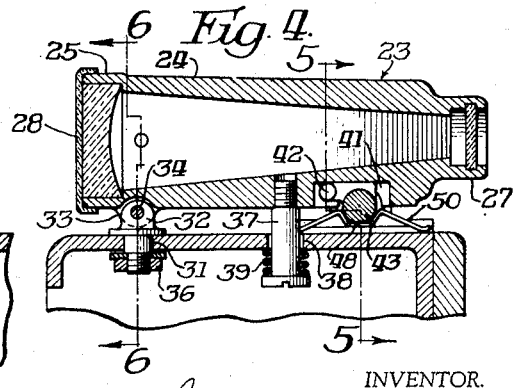

Patented Sept. 20, 1949

2,482,628

UNITED STATES PATENT OFFICE 2,482,628

PARALLAX COMPENSATING VIEW FINDER FOR CAMERAS

Alfred E. Little, Chicago, Ill., assignor to Busch Precision Camera Corporation, Chicago, Ill., a corporation of Illinois Application May 9, 1946, Serial No. 668,576

1 Claim. (Cl. 88—1.5)

This invention relates to a view finder for use on cameras and more particularly to a novelly constructed view finder capable of compensating for parallax effect caused by mounting of the view finder on a camera with its optical axis out of alignment with the optical axis of the camera lens.

In accordance with the foregoing, it is therefore an object of this invention to provide a view finder mountable on a camera, the view finder being capable of adjustment for compensating for the effect of parallax, so that the view as seen in the finder is identical with that surveyed in the lens.

Another object of this invention is the provision, in a view finder of the foregoing character, of means for indicating picture sizes for various focal lengths of lenses.

A further object of this invention is the provision of a view finder of the foregoing character which is simple in construction and easily manipulable even by an inexperienced operator.

Other and further objects of the present invention will be apparent from the following descriptions and claim and are illustrated in the accompanying drawings which, by way of illustration, show a preferred embodiment and the principle thereof and which is considered to be the best mode contemplated for applying that principle. Other embodiments of the invention embodying the same or equivalent principle may be used and structural changes may be made as desired by those skilled in the art without departing from the present invention and a purview of the appended claim.

In the drawings.

Fig. 3 is a cross-sectional view taken on line 3—3 of Fig. 1.

Fig. 4 is a cross-sectional view taken on line 4—4 of Fig. 3.

Fig. 5 is a cross-sectional view taken on line 5—5 of Fig. 4.

Fig. 6 is a cross-sectional view taken on line 6—6 of Fig. 4.

Fig. 7 is a cross-sectional view taken on line 7—7 of Fig. 3.

Fig. 8 is a cross-sectional view taken on line 8—8 of Fig. 3.

Figure 1:
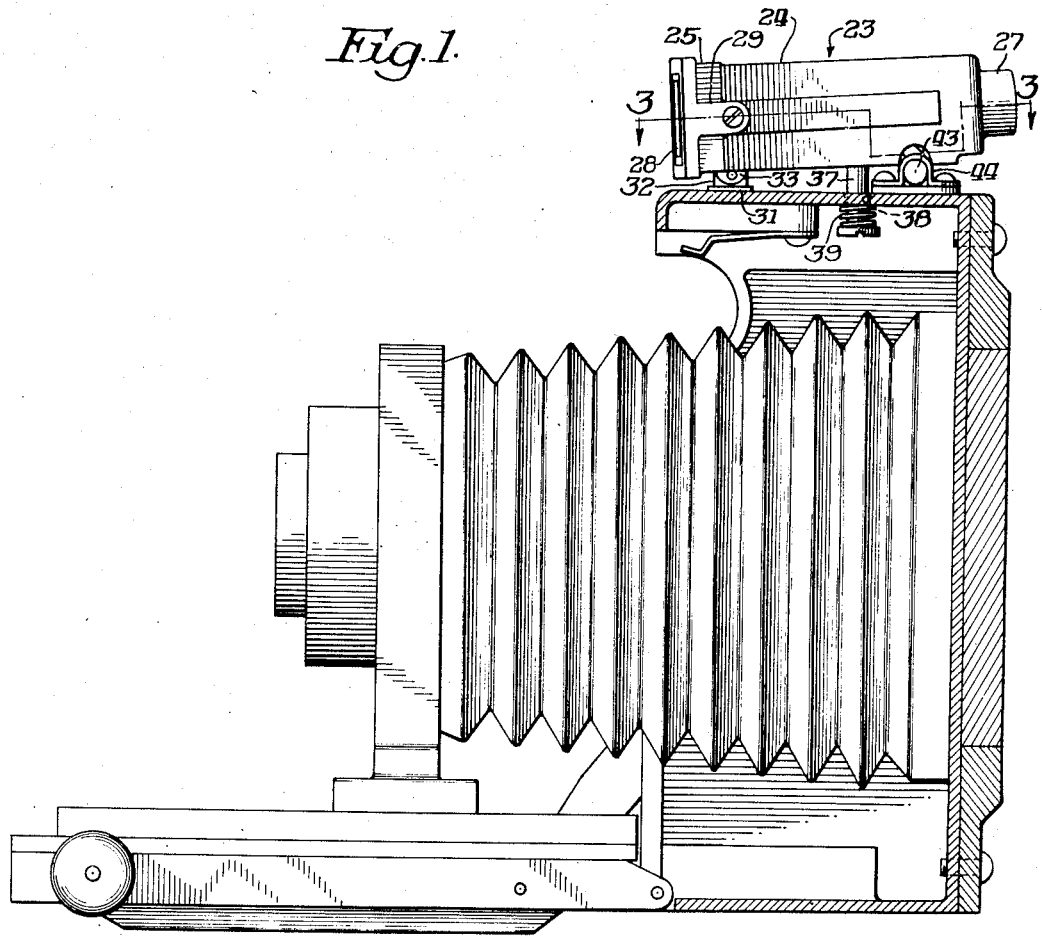
Fig. 1 is a side elevational view of the camera partially in section and showing my improved view finder mounted thereon.
Figure 2:
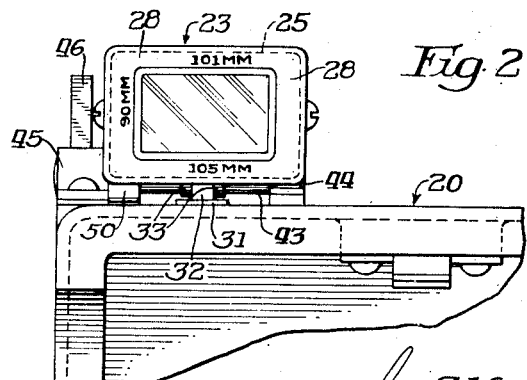
Fig. 2 is a front elevational view of the view finder.

Referring to the drawings, the numeral 20 designates generally a bellows type camera, of a well known type, on which my improved view finder indicated generally by the numeral 23 is mounted. The view finder 23 comprises a housing 24 containing a lens system arranged to present to the eye of the operator a reduced or miniature view of that which is surveyed by the camera lens. The housing 24 may be of any suitable construction, but in the embodiment illustrated, includes an elongated body portion tapering from a rectangular front portion 25 to and blending into a cylindrical rear portion 27 containing the eye piece of the lens system.

Mounted in the front portion 25 of the housing, forwardly of the lens is a mask made of transparent or translucent material and having engraved or imprinted thereon, lines forming rectangles in graduated sizes. Each of the rectangles carries insignia which identifies the same with relation to a particular focal length for which the view finder and camera lens is to be used. The mask 28 is suitably secured to the housing 24, as by screws, which pass through the perforated ears 29 integrally attached to the mask. The view finder 23 may be mounted directly on the camera or on a plate fixed to the camera, as will be presently described.

The housing 24 is mounted on the camera housing by a member 31 having a tongue 32 arranged to be received in the groove defined by spaced lugs 33, 33, attached to the under side of the housing 24. A pin 34 passing through registering perforations provided in the lugs 33, 33, and tongue 32 pivotally connects the housing 24 to the camera and permits pivotal movement of the housing 24 about a horizontal axis in a plane parallel to the plane of the camera lens. The member 31 passes through the top wall of the camera housing and is retained by a lock nut 36, but is pivotally movable about a vertical axis. The view finder housing is thus adapted for pivotal movement in two directions, both vertically and horizontally.

A stud 37 projects through an elongated aperture 38 in the top wall of the camera housing and is in threaded engagement with the view finder housing 24. A spring 39 carried on the stud 37 is confined between the under side of the top wall of the camera housing and the head of the stud 37 and serves to bias the movement of the view finder against the cam structure hereinafter to be described. It will be noted that the aperture 38 is elongated to accommodate the stud 37 in its movement with the housing about the vertical axis of the member 31.

A recess 41 is provided on the under side of the housing in the rearward portion thereof. The walls of said recess 41, as will be seen in Fig. 3, are in parallel relation and angularly inclined relative to the longitudinal axis of the housing. A T-shaped cam element 42, carried on a spindle 43, rotatably mounted at each end, in journals 44 and 45, is arranged to engage the walls of the recess 41. A lever 46 fixed to the spindle 43 is intended for rotating the spindle in actuating the cam element 42.

It will be seen that as the lever 46 is moved to rotate the spindle 43, the cam element 42 engages both the top and side walls of the recess 41, causing the rearward portion of the housing 24 to be elevated and simultaneously to swing in a counter-clockwise direction, as viewed in Figure 3. The optical axis of the lens system in the view finder is thereby moved out of parallel relationship with the optical axis of the lens of the camera to thereby provide compensation for the parallax effect resulting from the positioning of the view finder on the camera in spaced relation to the camera lens.

A plurality of chordal surfaces 48 of varying lengths are provided on the periphery of the spindle portion adjacent the journal 45. These chordal surfaces are arranged to be selectively engageable by a spring member 50 mounted on the top wall of the camera for holding the cam element 42 in any one of a number of positions determined by the chordal surfaces. The positions of the chordal surfaces 48 are synchronized with specific positions of the cam element 42, so that each position of the cam element corresponds to a specific distance locating the position of the object to be photographed in relation to the position of the camera lens. Indica identifying the various focal distances within the camera range are disposed along the edges 52 of the slot 53 and a suitable mark is carried on the lever 46 to selectively register with the indicia to indicate to the operator the relative position of the view finder at any particular point of adjustment.

In making an adjustment of the view finder to compensate for parallax, the operator need only move the lever 46 to the indicia mark indicating a particular distance corresponding to the actual distance the object is located from the camera lens. The view finder is thereby moved to the proper position to compensate for parallax effect and to register for the operator the exact view as surveyed by the lens.

I claim:

In a view finder of the character described and having a substantially rectangular housing having a lens system therein, said housing being swivelly mounted at its front end, the herein invention comprising a recess in the bottom face of the housing adjacent its other end, said recess having walls forming a parallelogram in the longitudinal axis of the housing, a rotatable spindle extending beneath said recess, a cam member attached to said spindle and seated in said recess, said cam being T-shaped and having edges engaging the bottom face and side walls of said recess, a lever member on one end of said spindle, whereby said cam member is moved in operative engagement with the bottom face and side walls of said recess, thereby elevating the view finder housing and simultaneously rotating said housing in a counter-clockwise direction.

ALFRED E. LITTLE.

REFERENCES CITED

The following references are of record in the file of this patent:

UNITED STATES PATENTS

| Number | Name | Date |
|---|---|---|
| 1,312,283 | Stahlhuth | Aug. 5, 1919 |
| 1,566,217 | Krone | Dec. 15, 1925 |
| 1,583,706 | Tessier | May 4, 1926 |
| 1,616,723 | Wandersleb | Feb. 8, 1927 |
| 2,040,422 | Austin | May 12, 1936 |
| 2,123,494 | Barnack | July 12, 1938 |
| 2,191,027 | Ort | Feb. 20, 1940 |
| 2,191,281 | Leitz et al. | Feb. 20, 1940 |
| 2,232,440 | Bisschop | Feb. 18, 1941 |
| 2,267,811 | Brownscombe | Dec. 30, 1941 |
| 2,322,399 | Sperry et al. | June 22, 1943 |
| 2,394,521 | Lynn | Feb. 5, 1946 |

FOREIGN PATENTS

| Number | Country | Date |
|---|---|---|
| 85,924 | Austria | Nov. 10, 1921 |
| 548,569 | France | Oct. 25, 1922 |
| 705,829 | France | Mar. 17, 1931 |